July 16, 1940.  F. H. JOHNSTON  2,208,188
VALVE
Filed Jan. 20, 1939

INVENTOR
Frank H. Johnston
BY Henry G. Dylvig
ATTORNEY

Patented July 16, 1940

2,208,188

UNITED STATES PATENT OFFICE 2,208,188

VALVE

Frank H. Johnston, Dayton, Ohio, assignor to Premier Engineering Company, Dayton, Ohio, a corporation of Ohio Application January 20, 1939, Serial No. 251,920

4 Claims. (Cl. 251—144)

This invention relates to valves and more particularly to valves for use in fluid pipes or systems wherein the fluid has a pulsating flow, as for example, water that is pumped by a compression and suction pump.

An object of this invention is to provide a valve that opens the port in response to differential in pressures in the fluid in one direction and closes the port when the fluid pressures are reversed.

A further object of this invention is to provide a valve that is silent in its operation.

Another object of this invention is to provide a valve that is made for resilient material, wherein the outer edge has a greater flexibility than the core portion.

Another object of this invention is to provide a silent, cheap and efficient valve, adaptable for use, inter alia in fluids having a pulsating or intermittent movement.

Another object of this invention is to provide a valve that may yield when in closed position, so as to absorb the impact of the fluid, thereby cushioning this impact, to reduce or eliminate undesirable noises.

Other objects and advantages reside in the construction of parts, the combination thereof and the mode of operation as will become more apparent from the following description.

Figure 1:
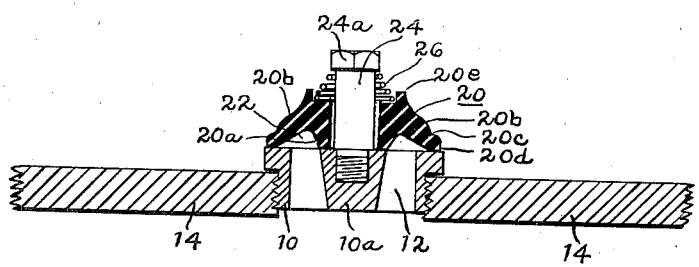

In the drawing, Figure 1 is a cross sectional view showing the valve in closed position.

Figure 2:
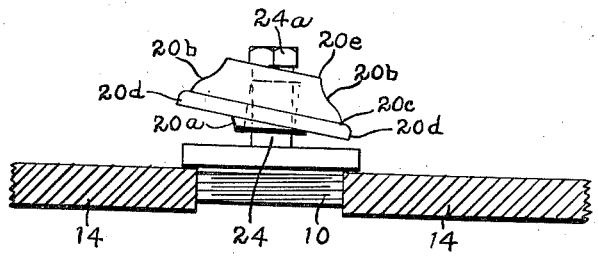

Figure 2 is a side view showing the valve in open position.

In water systems utilizing a reciprocatory piston for supplying impulses to the water, check valves responding to differentials in water pressures are used to permit the flow of the water in one direction; but prevent the return thereof. Valves that have been used for this purpose have been noisy, very likely due to the impact of the impulses in the water, causing a hammering or a pounding sound which is readily carried from the source of origin by the water mains throughout the house or the building. In spite of the fact that such valves have been used over a long period of years, the silencing of these valves has remained an unsolved problem. Some pump manufacturers have argued that it is impossible to solve the problem and therefore it is necessary to resort to the use of rotary pumps, so as to eliminate the use of reciprocatory pistons.

In the embodiment shown in the drawing, a valve has been produced that simulates a vacuum cup in outward appearance, and in some respects has characteristics in common with a suction cup. The valve structure is preferably made from a good quality of resilient rubber molded into shape. The core portion of the valve has such dimensions as compared with the outer edge that the core will not yield as readily as does the periphery of the valve. This permits the valve to open sufficiently to allow the fluid to flow through the valve with a lesser amount of travel of the core portion than the distance through which the outer edge of the valve travels. In other words, the inertia caused by the movement of the greater portion of the mass is not as great as it would be if the entire valve traveled through the same distance.

In addition to the valve structure being such that the outer periphery does not slap the valve seat sufficiently loud to cause undesirable noise, the resiliency of the valve structure functions as a shock absorber for the impacts or pulsations in the water stream.

Although the valve structure is referred to in connection with a shallow well water lift or pump, it is equally as applicable for use with any fluid actuating device irrespective of the mode of propulsion. For example, the valve may be used in other water systems, in gasoline pumps, in gas systems, chemical systems, stills and the like, providing the fluid, whether liquid or gaseous, does not have a deleterious effect upon the valve structure. Obviously, if such chemicals would have a deleterious effect so as to preclude the use of rubber, any other suitable resilient material having the same properties could be substituted for rubber, so as to overcome the chemical reaction.

Referring to the drawing, the reference character 10 indicates any conventional valve seat having port holes 12, which valve seat is integral with or secured to the support 14 by screw threads, as shown in the drawing. The valve seat 10 has been shown for the purposes of illustration. Any other suitable valve structure could be used within the purview of this invention. A check valve is mounted adjacent the port holes 12, which permits the flow of the fluid in one direction; but prevents the return thereof. It is this check valve that constitutes my improvement.

This check valve includes a valve body 20 provided with a core portion 20a. This core portion 20a merges into an arcuate outwardly extending peripheral portion 20b, which contains an annular groove 20c near the outer edge. This groove 20c reduces the thickness of the wall portion 20b, so as to provide a feathery edge 20d that is in contact with the valve seat when the valve is in closed position. This feathery contacting edge provides a fluid-tight seal between the outer periphery of the valve seat and the valve. An annular inner recess 22 is located under the wall portion 20b and is bounded on the inside by the core portion 20a. This annular groove or recess 22 reduces the weight of the valve structure and results in a comparatively thin wall for the portion 20b, so as to provide flexibility for the feathery edge 20d.

The valve is held in position by a screw or bolt 24 threadedly engaging the valve seat and extending through a centrally located aperture in the core portion 20a. The diameter of this aperture is somewhat larger than the diameter of the screw or bolt 24. This permits the valve to tilt upon being opened, as will appear more fully later. The valve 20 is held in "down" position against this seat 10 by a spring 26, mounted between the head 24a and the valve 20, said valves having an annular recess at its upper end, as viewed in Figure 1, which recess provides a seat for the larger end of this spring 26. The valve 20 is provided with an annular shoulder 20e, which forms a boundary for the spring receiving recess.

Whenever the fluid pressure on the valve seat side of the valve exceeds the back pressure exerted upon the opposite side of the valve, the valve 20 will rise into the position shown in Figure 2 by compressing the spring 26, so as to permit the fluid to flow through the valve, as is well known to those skilled in the art.

The valve 20 may tilt upon opening. Especially is there a tendency for the valve to tilt in the event the fluid pressures are not uniform throughout the ports, or in the event the fluid flows through the valve very rapidly. This tilting action is facilitated by the "sloppy" fit between the bolt 24 and the aperture extending through the core 20a. The spring 26 exerts a pressure against the top of the core portion 20a, as viewed in Figure 2. Due to the flexibility or resiliency of the material used in making the valve, the extension 20b and the feathery edge 20d will yield, so as to permit a greater movement of the edge 20d than the core portion 20a. This results in the entire mass of the valve for a given opening traveling through a lesser distance than if a rigid valve structure were used in producing the same clearance. Obviously, this reduces the inertia of the valve when slapping into closed position. The valve, as is well known to those skilled in the art, when moving into closed position is actuated by the spring 26 and the reversal of the fluid pressures.

Whether the annoying and disturbing noises in the valves now appearing on the market are caused by the physical impact of the valve upon its seat, or the impact of the fluid coming to a sudden stop, is immaterial, as the valve shown and described herein eliminates these annoying noises when used with water lifts and the like operating at pressures ordinarily used in domestic water lifts.

It has been found that the use of the feathery edge is partly responsible for the elimination of undesirable noises. This, together with a core having less resiliency than the feathery edge, has proved very satisfactory. The heavy or reenforced core structure has been found to produce the required physical strength, which is necessary to produce a valve having the requisite durability.

The resilient structure of the valve in addition to providing flexibility as far as the physical impact of the valve upon the seat is concerned, also functions to cushion or absorb the intermittent impacts or impulses generated by the pulsating or reciprocatory pumping action. This cushioning of the impacts of the fluid is believed to contribute to the silence of the fluid system.

When the valve is in closed position, the spring 26 exerts a pressure towards the valve seat, causing the core portion 20a to be seated tightly upon the hub 10a of the valve seat. At the same time, the feathery edge 20b seals the periphery of the valve. Thus, the core provides a seal, preventing fluid from escaping through the aperture and the feathery edge seals the periphery, so as to prevent the flow of fluid around the valve when in closed position.

The explanation as to the causes of the undesirable noises and the elimination of these noises by the valve shown herein is offered merely as a plausible one. The actual beneficial results of the valve structure shown herein speak for themselves, whatever may be the cause.

Although the preferred modification of the device has been described, it will be understood that within the purview of this invention various changes may be made in the form, details, proportion and arrangement of parts which generally stated consist in a device capable of carrying out the objects set forth, in the novel parts, combination of parts and mode of operation, as disclosed and defined in the appended claims.

Having thus described my invention, I claim:

1. A check valve assembly including a ported valve seat, a self-contained resilient valve member and yielding means urging the valve member against the valve seat but yielding in response to increased fluid pressure on the ported side of the valve member to open the valve member, said valve member including a core portion merging into a peripheral extension having an arcuate cross sectional area, so as to form an annular groove surrounding the core portion, an outer groove adjacent the edge of said peripheral extension causing an annular depression in the wall of said extension so as to permit the feathery edge to yield more easily than the remaining portion of the valve member.

2. A check valve assembly including a ported valve seat, a self-contained resilient valve member having a concentric bore, a supporting member passing through the bore for aligning the valve member with respect to the valve seat, and yielding means urging the valve member against the valve seat but yielding in response to increased fluid pressure on the ported side of the valve member to open the valve member, said valve member including a core portion merging into a peripheral extension having an arcuate cross sectional area, so as to form an annular groove surrounding the core portion, an outer groove adjacent the edge of said peripheral extension causing an annular depression in the wall of said extension so as to permit the feathery edge to yield more easily than the remaining portion of the valve member.

3. A check valve assembly including a ported valve seat, a self-contained resilient valve member having a concentric bore, a supporting member passing through the bore for aligning the valve member with respect to the valve seat, said supporting member including abutment means arranged in spaced relation with the valve member, and a helical spring mounted upon the supporting member, said spring extending from said abutment means to the valve member urging the valve member against the valve seat but yielding in response to increased fluid pressure on the ported side of the valve member to open the valve member, said valve member including a core portion merging into a peripheral extension having an arcuate cross sectional area, so as to form an annular groove surrounding the core portion, an outer groove adjacent the edge of said peripheral extension causing an annular depression in the wall of said extension so as to permit the feathery edge to yield more easily than the remaining portion of the valve member.

4. A check valve assembly including a removably mounted ported valve seat, a self-contained resilient valve member, means for supporting the valve member in aligned relation with respect to the valve seat, said means including a yielding member urging the valve member against the valve seat but yielding in response to increased fluid pressure on the ported side of the valve member to open the valve member, said valve member including a core portion merging into a peripheral extension having an arcuate cross sectional area, so as to form an annular groove surrounding the core portion, an outer groove adjacent the edge of said peripheral extension causing an annular depression in the wall of said extension so as to permit the feathery edge to yield more easily than the remaining portion of the valve member.

FRANK H. JOHNSTON.